United States Patent
Williams et al.

(10) Patent No.: US 9,761,027 B2
(45) Date of Patent: Sep. 12, 2017

(54) METHODS AND SYSTEMS FOR INTEGRATED PLOT TRAINING

(71) Applicant: General Electric Company, Schenectady, NY (US)

(72) Inventors: Scott Terrell Williams, Minden, NV (US); David Michael Robertson, Bellevue, WA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/298,109

(22) Filed: Oct. 19, 2016

(65) Prior Publication Data

US 2017/0039742 A1 Feb. 9, 2017

Related U.S. Application Data

(63) Continuation-in-part of application No. 13/707,914, filed on Dec. 7, 2012, now abandoned.

(51) Int. Cl.
| | |
|---|---|
| *G06T 11/20* | (2006.01) |
| *G05B 23/02* | (2006.01) |
| *G07C 3/14* | (2006.01) |
| *G07C 3/12* | (2006.01) |
| *G06T 7/00* | (2017.01) |

(52) U.S. Cl.
CPC ........ *G06T 11/206* (2013.01); *G05B 23/0205* (2013.01); *G05B 23/0232* (2013.01);
(Continued)

(58) Field of Classification Search
CPC ... G06T 11/206; G05B 23/00; G05B 23/0205; G05B 23/0218; G05B 23/0221
(Continued)

(56) References Cited

U.S. PATENT DOCUMENTS

| | | | |
|---|---|---|---|
| 5,029,110 | A | 7/1991 | Purchase et al. |
| 6,477,485 | B1 | 11/2002 | Radulovic et al. |

(Continued)

FOREIGN PATENT DOCUMENTS

| | | |
|---|---|---|
| EP | 1111550 A1 | 6/2001 |
| EP | 1298513 A2 | 4/2003 |

(Continued)

OTHER PUBLICATIONS

PCT Search Report and Written Opinion dated Feb. 5, 2014 issued in connection with corresponding WO Application No. PCT/US2013/069370.

*Primary Examiner* — Ke Xiao
*Assistant Examiner* — Andrew Shin
(74) *Attorney, Agent, or Firm* — Fletcher Yoder, P.C.

(57) ABSTRACT

A method for correlating data collected from at least one sensor of machinery with a malfunction of the machinery includes storing, in a memory, one or more reference data sets where each reference data set is associated with a malfunction of the machinery. The method also includes receiving measurement data based on measurement information from the at least one sensor and displaying, with a display device, a first plot representing a reference data set of the one or more reference data sets where the first plot has a plot type associated with the reference data set. The method also includes displaying, with the display device, a second plot representing the measurement data where the second plot is plotted using the first plot based at least in part with the association of the plot type with the reference data set. Furthermore, the method includes displaying, with the display device, an explanation of an appearance of the second plot.

15 Claims, 8 Drawing Sheets

(52) U.S. Cl.
CPC .................. *G06T 7/97* (2017.01); *G07C 3/12* (2013.01); *G07C 3/14* (2013.01)

(58) Field of Classification Search
USPC ............ 345/440, 440.1, 440.2; 700/108–110
See application file for complete search history.

(56) References Cited

U.S. PATENT DOCUMENTS

| | | |
|---|---|---|
| 6,753,944 B1 | 6/2004 | Danjnowicz |
| 7,010,461 B2 | 3/2006 | Draxton et al. |
| 7,277,777 B2 | 10/2007 | Draxton et al. |
| 7,756,657 B2 | 7/2010 | Davidson et al. |
| 8,089,390 B2 | 1/2012 | Jones et al. |
| 8,170,800 B2 | 5/2012 | Aamodt et al. |
| 2002/0152056 A1 | 10/2002 | Herzog |
| 2002/0183971 A1 | 12/2002 | Wegerich et al. |
| 2005/0149264 A1 | 7/2005 | Tarvin et al. |
| 2005/0177352 A1 | 8/2005 | Gravel |
| 2006/0020402 A1 | 1/2006 | Bischoff et al. |
| 2007/0219758 A1 | 9/2007 | Bloomfield |
| 2008/0079723 A1 | 4/2008 | Hanson et al. |
| 2009/0037206 A1 | 2/2009 | Byrne et al. |
| 2009/0173494 A1 | 7/2009 | Tarvin et al. |
| 2010/0278086 A1 | 11/2010 | Pochiraju et al. |
| 2011/0161743 A1 | 6/2011 | Kato |
| 2012/0130678 A1 | 5/2012 | Ishioka et al. |
| 2012/0314844 A1 | 12/2012 | Wiggers |

FOREIGN PATENT DOCUMENTS

| | | |
|---|---|---|
| GB | 2440355 A | 1/2008 |
| WO | 2004029557 A1 | 4/2004 |
| WO | 2011138488 A1 | 11/2011 |

US 9,761,027 B2

METHODS AND SYSTEMS FOR INTEGRATED PLOT TRAINING

CROSS-REFERENCE TO RELATED APPLICATIONS

This application is a continuation-in-part of U.S. patent application Ser. No. 13/707,914 entitled "Methods and Systems for Integrated Plot Training," which was filed on Dec. 7, 2012 and published as U.S. Publication No. 2014/0160152.

BACKGROUND OF THE INVENTION

The field of the invention relates generally to displaying information, and more particularly to methods and systems for use in identifying a malfunction in a machine or other asset based on a plot of data collected from the asset.

In a facility in which resources are received, processed, and converted by machines into electricity or another product, it is often beneficial to monitor the status of the machines to determine whether they are operating normally. To facilitate such monitoring, in at least some facilities, sensors are positioned adjacent to such machines to measure one or more parameters or characteristics, such as vibrations, temperatures, voltages or currents associated with the machines. In some environments with multiple machines and multiple sensors, the information collected by the sensors is transmitted to a central computer for evaluation by the computer and/or a user of the computer. Additionally, the information may be stored in a database and reviewed on an as-needed basis.

Data stored as described above may relate to a particular type of measurement for a particular machine. The data may indicate the existence of a malfunction in the machine. However, identifying the existence and nature of a malfunction from the data, even when the data is displayed in a plot, can be difficult for those who are not familiar with the machine or diagnostic analysis per plot and data type.

BRIEF DESCRIPTION OF THE INVENTION

In a first embodiment, A method for correlating data collected from at least one sensor of machinery with a malfunction of the machinery includes storing, in a memory, one or more reference data sets where each reference data set is associated with a malfunction of the machinery. The method also includes receiving measurement data based on measurement information from the at least one sensor and displaying, with a display device, a first plot representing a reference data set of the one or more reference data sets where the first plot has a plot type associated with the reference data set. The method also includes displaying, with the display device, a second plot representing the measurement data where the second plot is plotted using the first plot based at least in part with the association of the plot type with the reference data set. Furthermore, the method includes displaying, with the display device, an explanation of an appearance of the second plot.

In another embodiment, a computing device for correlating data collected from at least one sensor of machinery with a condition of the machinery, the computing device includes a processor, a display device coupled to the processor, and a memory coupled to the processor. The memory contains processor-executable instructions configured to cause the processor to store, in the memory, one or more reference data sets, wherein each reference data set is associated with a condition of the machinery. The instructions also cause the processor to receive measurement data based on measurement information from the at least one sensor and display, with a display device, a reference plot representing a reference data set of the one or more reference data sets. The first plot has a plot type associated with the reference data set. The instructions also cause the processor to display, with the display device, a measurement plot representing the measurement data based at least in part with the association of the plot type with the reference data set.

In a third embodiment, a method includes storing, in a memory, two or more reference data sets, wherein each reference data set is associated with a condition of the machinery and receiving measurement data based on measurement information from at least one sensor of machinery. The method also includes displaying, with a display device, a first plot representing a first reference data set of the two or more reference data sets, wherein the first plot has a first plot type associated with a first condition of the machinery. Additionally, the method includes displaying, with the display device, a second plot representing the measurement data. Moreover, the second plot is plotted using the first plot type. After displaying the first plot, a third plot is displayed that represents a second reference data set of the two or more reference data sets, wherein the third plot has a second plot type associated with a second condition of the machinery. Furthermore, the method includes changing the display of the measurement data from the first plot type to the second plot type based at least in part on the display of the third plot.

DETAILED DESCRIPTION OF THE INVENTION

As discussed below, a computing device that monitors and/or controls machinery may display graphical information sensed from the machinery. This information may be presented in any number of ways depending on a type of issue or malfunction associated. For example, vibration data from various sensors may be used to display a vibration orbit shape for a cracked crankshaft or temperature data may be used to display a malfunction associated with a worn ball bearing. The computing device may assist or directly identify whether the present information matches reference data and/or plots that are stored in memory by presenting measurement information in a format that matches the reference plot type. This reference plot type may be associated with a particular error type (e.g., cracked crankshaft) that is readily detectable using a specific plot type of data acquired and/or stored. In other words, the type of malfunction associated with the plot may control what type of plot is appropriate. The computing device may present reference and measurement plots of a similar type based on the malfunction type. Further, the reference data and the measurement data may even be plotted on the same coordinates. Moreover, the stored data may be stored in a general format rather than only the displayed plot so that malfunction-specific information that may be used for a subsequent malfunction plot is available even if unused in a previous malfunction plot.

Figure 1:
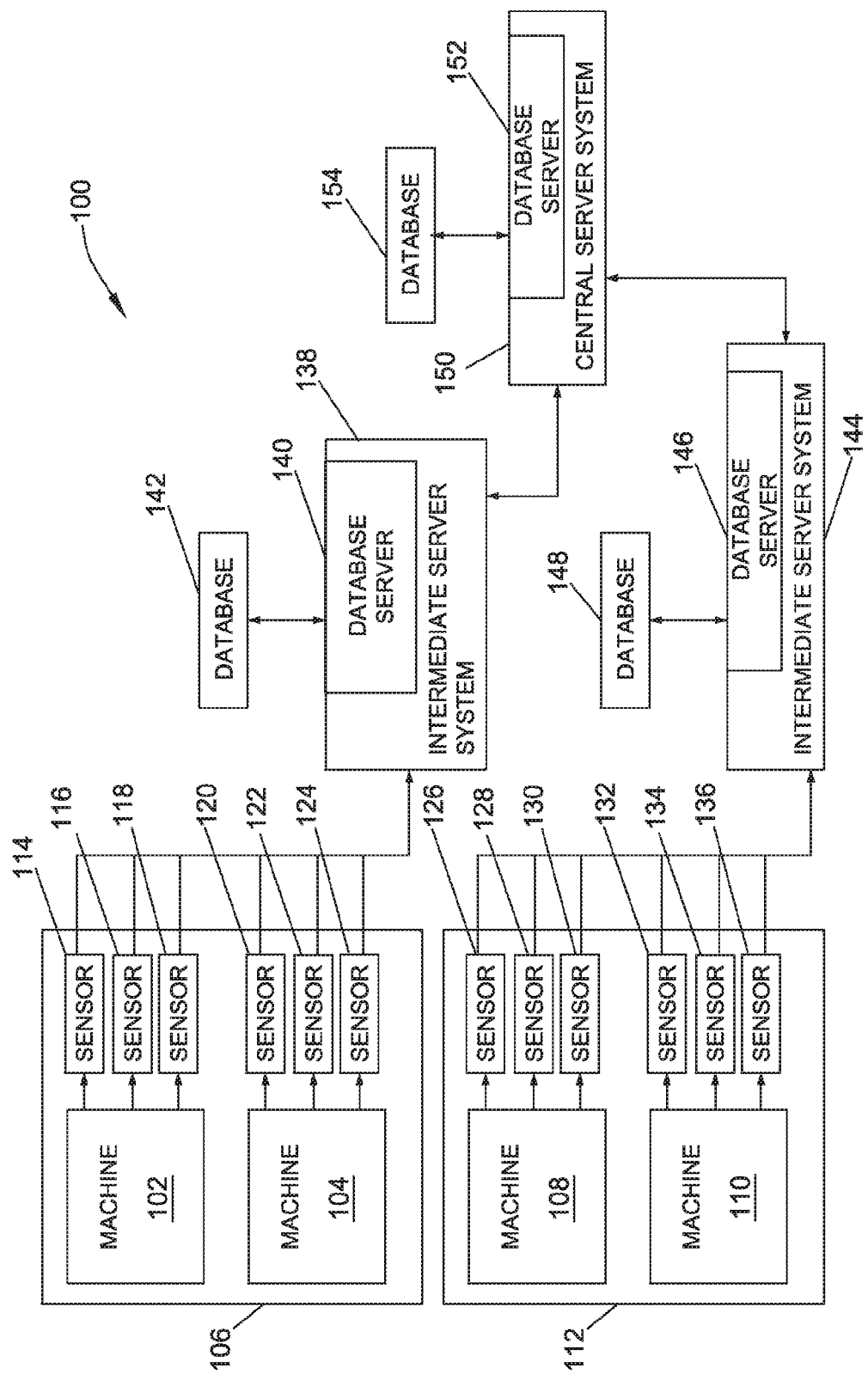
FIG. 1 is a block diagram of an exemplary system that may be used to collect information from multiple sensors from multiple machines.

FIG. 1 is a block diagram of an exemplary system 100 for use in collecting information from multiple sensors 114, 116, 118, 120, 122, 124, 126, 128, 130, 132, 134, and 136 (referred to collectively as sensors 114-136) from multiple machines 102, 104, 108, and 110. In the illustrated embodiment, machines 102 and 104 are located in a facility 106. Likewise, machines 108 and 110 are located in a facility 112. Facilities 106 and 112 may be involved, for example, in the generation of electricity. For example, facilities 106 and 112, and more specifically, machines 102, 104, 108, and 110, may be used in converting a raw resource into electricity. In some embodiments, facilities 106 and 112 may be used in any other process involving multiple machines. In some embodiments, facilities 106 and 112 may be used in different processes. In some embodiments, there may be any number of facilities and/or machines.

Sensors 114, 116, and 118 are communicatively coupled to machine 102. In an embodiment, sensor 114 measures a temperature of machine 102, sensor 116 measures a vibration of machine 102, and sensor 118 measures a voltage of machine 102. Likewise, sensors 120, 122, and 124 are also communicatively coupled to machine 104. In the exemplary embodiment, sensor 120 measures a temperature of machine 104, sensor 122 measures a vibration of machine 104, and sensor 124 measures a voltage of machine 104. Sensors 126, 128, and 130 are communicatively coupled to machine 108. Sensor 126 measures a temperature of machine 108, sensor 128 measures a vibration of machine 108, and sensor 130 measures a voltage of machine 108. Additionally, sensors 132, 134, and 136 are also communicatively coupled to machine 110 to enable sensor 132 to measure a temperature of machine 110, sensor 134 to measure a vibration of machine 110, and sensor 136 to measure a voltage of machine 110.

An intermediate server system 138 is communicatively coupled to sensors 114, 116, 118, 120, 122, and 124. Intermediate server system 138 includes a database server 140 that stores and retrieves information in a database 142. Intermediate server system 138 receives measurement data from sensors 114, 116, 118, 120, 122, and 124 and causes database server 140 to store the received measurement data in database 142. Similarly, an intermediate server system 144 is communicatively coupled to sensors 126, 128, 130, 132, 134, and 136. Intermediate server system 144 includes a database server 146 that stores and retrieves information in a database 148. Intermediate server system 144 receives measurement data from sensors 126, 128, 130, 132, 134, and 136 and causes database server 146 to store the received measurement data in database 148.

A central server system 150 is coupled to intermediate server systems 138 and 144. Similar to intermediate server systems 138 and 144, central server system 150 includes a database server 152 that stores and retrieves information in a database 154. Central server system 150 transmits instructions to intermediate server systems 138 and 144 to provide measurement data stored in databases 142 and 148, respectively, for storage in database 154. In the exemplary embodiment, central server system 150 transmits instructions and receives the corresponding measurement data at regular intervals, for example, daily. In the exemplary embodiment, for efficiency, the transmissions from central server system 150 ensure that only measurement information that has been added or updated since the previous time the intermediate server systems 138 and 144 provided measurement information to central server system 150 are transmitted to central server system 150. After receiving the measurement information from intermediate server systems 138 and 144, central server system 150 causes database server 152 to store the received measurement information in database 154. Some embodiments may include a different number of sensors and/or sensors that may measure different characteristics or behaviors of one or more machines. Additionally, in alternative embodiments, there are no intermediate server systems and all sensors are coupled to a central server system. In some embodiments, all sensors are coupled to a single computing device.

Figure 2:
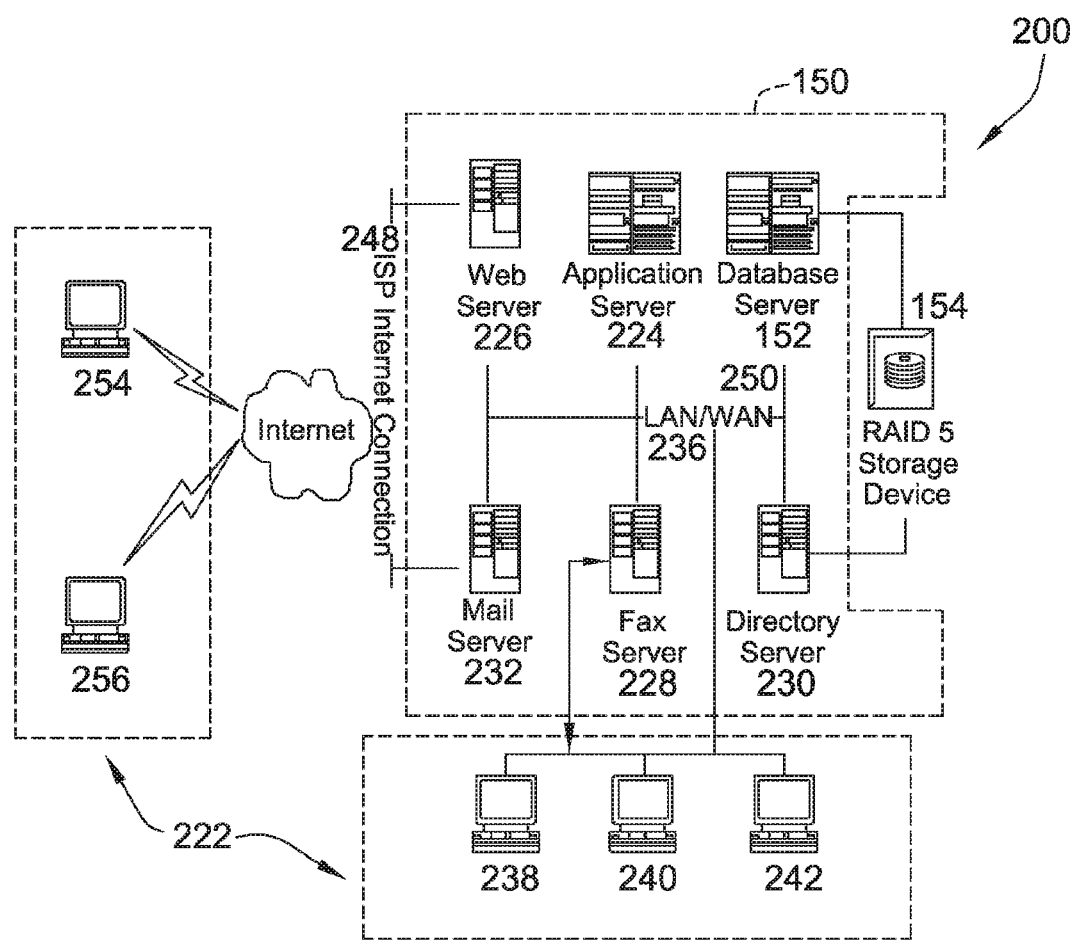
FIG. 2 is a block diagram of an exemplary system that may be used for displaying measurement information from at least one sensor in a machine.

FIG. 2 is a block diagram of an exemplary system 200 for use in displaying measurement information from at least one sensor (such as sensor 114) in a machine (such as machine 102) in accordance with an embodiment of the present invention. Components in system 200, similar to components of system 100 (shown in FIG. 1), are identified in FIG. 2 using the same reference numerals used in FIG. 1. System 200 includes central server system 150 and client systems 222. Central server system 150 also includes database server 152, an application server 224, a web server 226, a fax server 228, a directory server 230, and a mail server 232. A disk storage unit containing database 154 is coupled to database server 152 and to directory server 230. Servers 152, 224, 226, 228, 230, and 232 are communicatively coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 using an Internet link or are connected through an Intranet. In the exemplary embodiment, database 154 includes reference data sets of sensor information pertaining to normal operations and malfunctions of a variety of machines, including machines that are similar or identical to machines 102, 104, 108, and 110. In some embodiments, such reference data sets of sensor information are stored in a remote database, which is accessible through a communications network, for example, the Internet.

Each workstation, 238, 240, and 242, is a computing device that includes a web browser. Although the functions performed at the workstations are typically illustrated as being performed at respective workstations 238, 240, and 242, such functions can be performed at one of many computing devices coupled to LAN 236. Workstations 238, 240, and 242 are illustrated as being associated with separate functions only to facilitate an understanding of the different types of functions that can be performed by individuals having access to LAN 236.

Central server system 150 is configured to be communicatively coupled to entities outside LAN 236 as well, such as workstations 254 and 256 via an Internet connection 248. The communication in the exemplary embodiment is illustrated as being performed using the Internet, however, any other wide area network (WAN) type communication can be utilized in some embodiments, i.e., the systems and processes are not limited to being practiced using the Internet. In addition, and rather than WAN 250, local area network 236 could be used in place of WAN 250.

In the exemplary embodiment, any authorized individual or entity having a workstation 238, 240, 242, 254, 256 may access system 200. At least one of the client systems includes a manager workstation 256 located at a remote location. Workstations 254 and 256 include a computing device having a web browser. Also, workstations 254 and 256 are configured to communicate with server system 150. Furthermore, fax server 228 is configured to communicate with remotely located client systems 222 using a telephone link.

Figure 3:
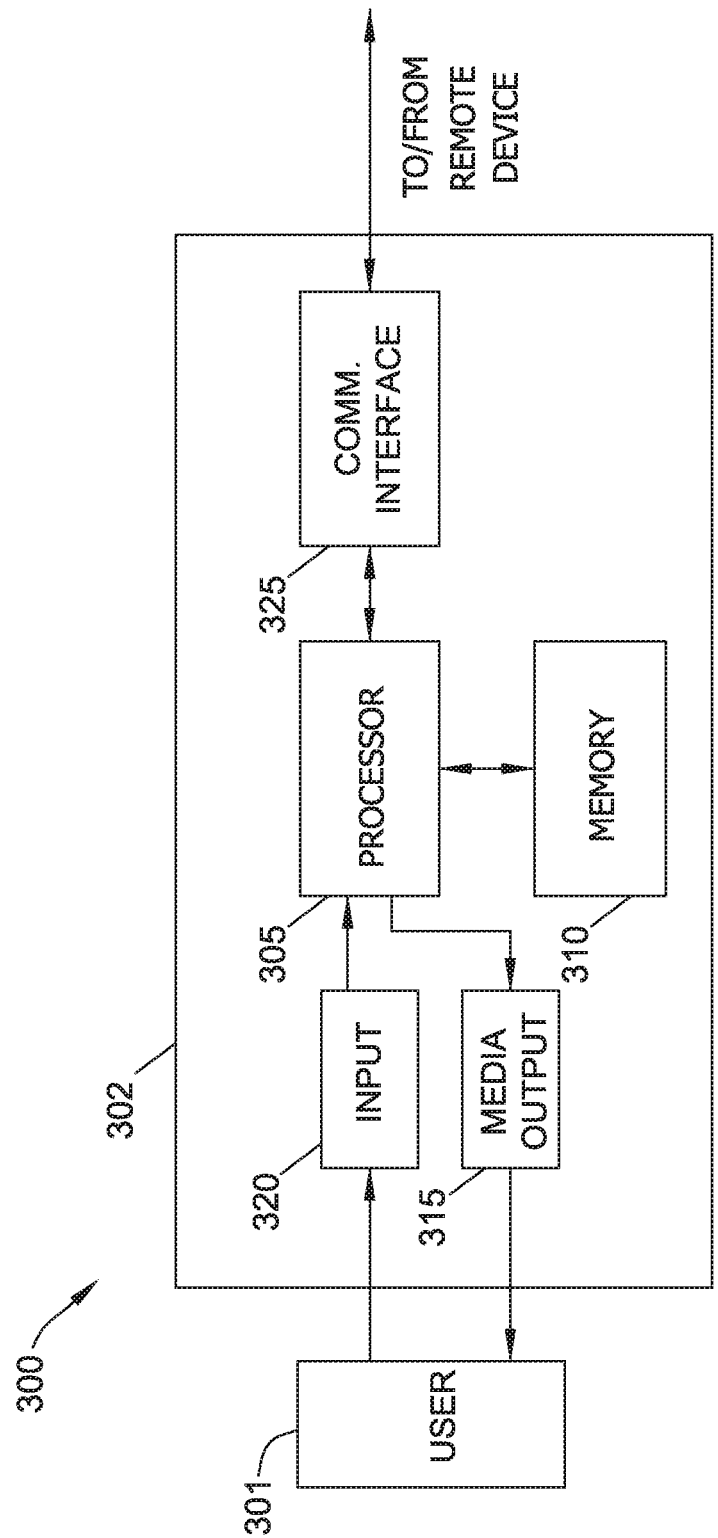
FIG. 3 illustrates an exemplary computing device that may be used with the system shown in FIG. 2.

FIG. 3 illustrates an exemplary computing device 302 that may be used with system 100 and/or system 200. For example, computing device 302 is representative of intermediate server 138, intermediate server 144, any of servers 152, 224, 226, 228, 230, 232, of central server system 150, and client systems 222. Computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer readable media.

Computing device 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 315.

In some embodiments, computing device 302 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Computing device 302 may also include a communication interface 325, which is communicatively coupleable to a remote computing device such as a server system 138, 144, 150 or a client system 222. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, processor-executable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from a server system, for example central server system 150. A client application allows a user, such as user 301, to display and interact with a server system, such as central server system 150, in a manner that does not necessarily involve a web page or website and which may offload more storage and/or processing functions to the client application from the server system.

Memory area 310 may include, but is not limited to, any computer-operated hardware suitable for storing and/or retrieving processor-executable instructions and/or data. Memory area 310 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 310 may include multiple storage units such as hard disks or solid-state disks in a redundant array of inexpensive disks (RAID) configuration. Memory area 310 may include a storage area network (SAN) and/or a network attached storage (NAS) system. In some embodiments, memory area 310 includes memory that is integrated in computing device 302. For example, computing device 302 may include one or more hard disk drives as memory 310. Memory area 310 may also include memory that is external to computing device 302 and may be accessed by a plurality of computing devices 302. The above memory types are exemplary only, and are thus not limiting as to the types of memory usable for storage of a processor-executable instructions and/or data.

Figure 4:
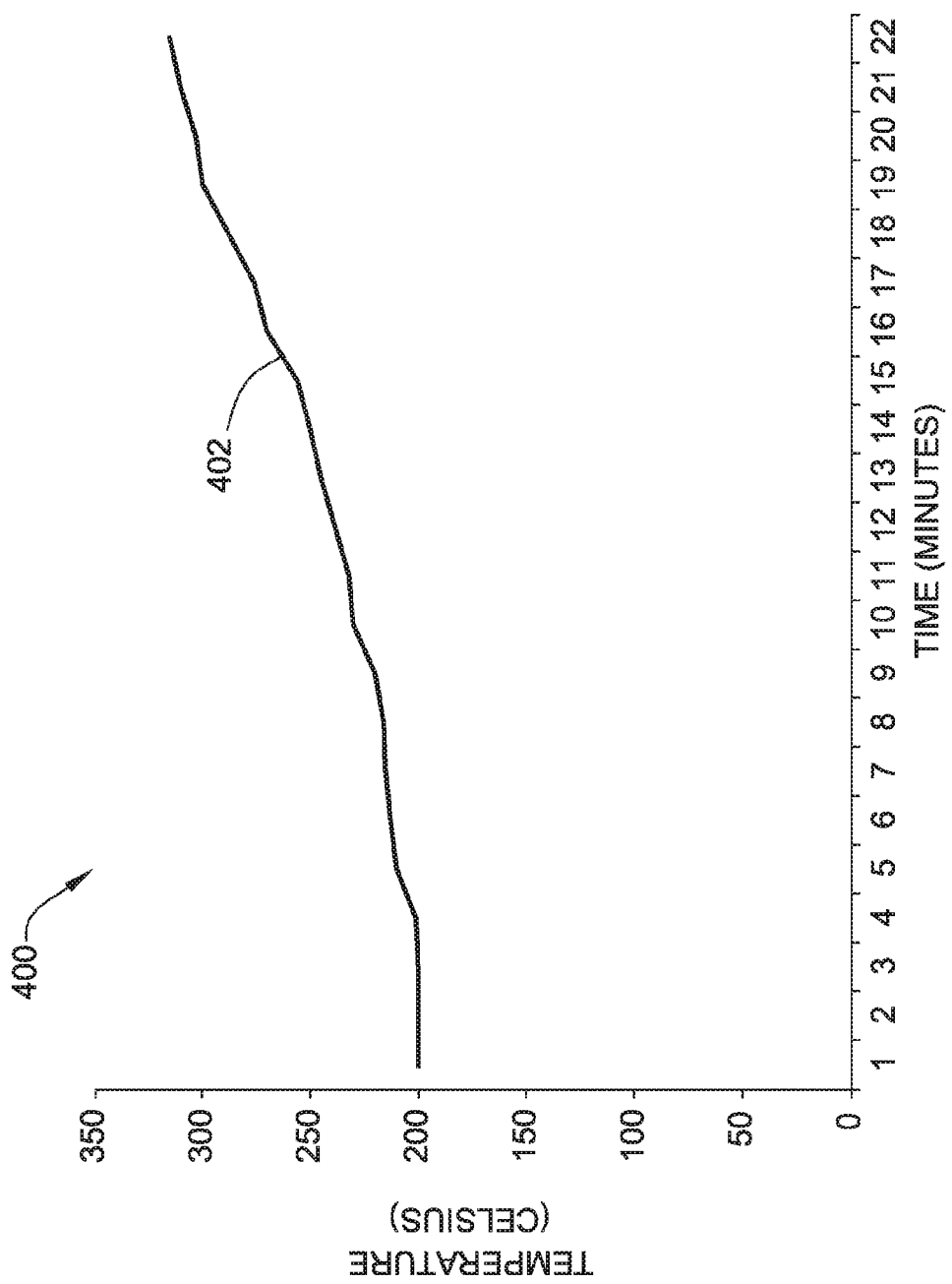
FIG. 4 is an exemplary plot that may be generated using the system shown in FIG. 2.

FIG. 4 is a plot 400 that may be generated using measurements from the system 200 (shown in FIG. 2). Plot 400 may be displayed using a display device of media output component 315 (shown in FIG. 3). Plot 400 represents a data set of temperature information measured by sensor 114 (shown in FIG. 1) for machine 102 (shown in FIG. 1). The measurement information is stored in memory area 310 (shown in FIG. 3). As explained above, memory area 310 may include memory that is integrated into computing device 302 (shown in FIG. 3) and/or memory that is external, for example database 154 (FIGS. 1 and 2). Plot 400 includes a trend 402 showing a temperature increasing over time. A technician or other user viewing plot 400 may be unable to determine the cause of the increase in temperature over time and/or may not know that the trend 402 even represents a malfunction of machine 102.

Stored in memory area 310 (shown in FIG. 3), is at least one reference data set of information pertaining to performance and/or a malfunction of a machine that is of the same, or similar, type as machine 102 (shown in FIG. 1). Again, as explained above, memory area 310 may include memory that is integrated into computing device 302 and/or memory that is external, for example database 154 (FIGS. 1 and 2). This reference data set may be used to generate a second plot, as shown in FIG. 5.

Figure 5:
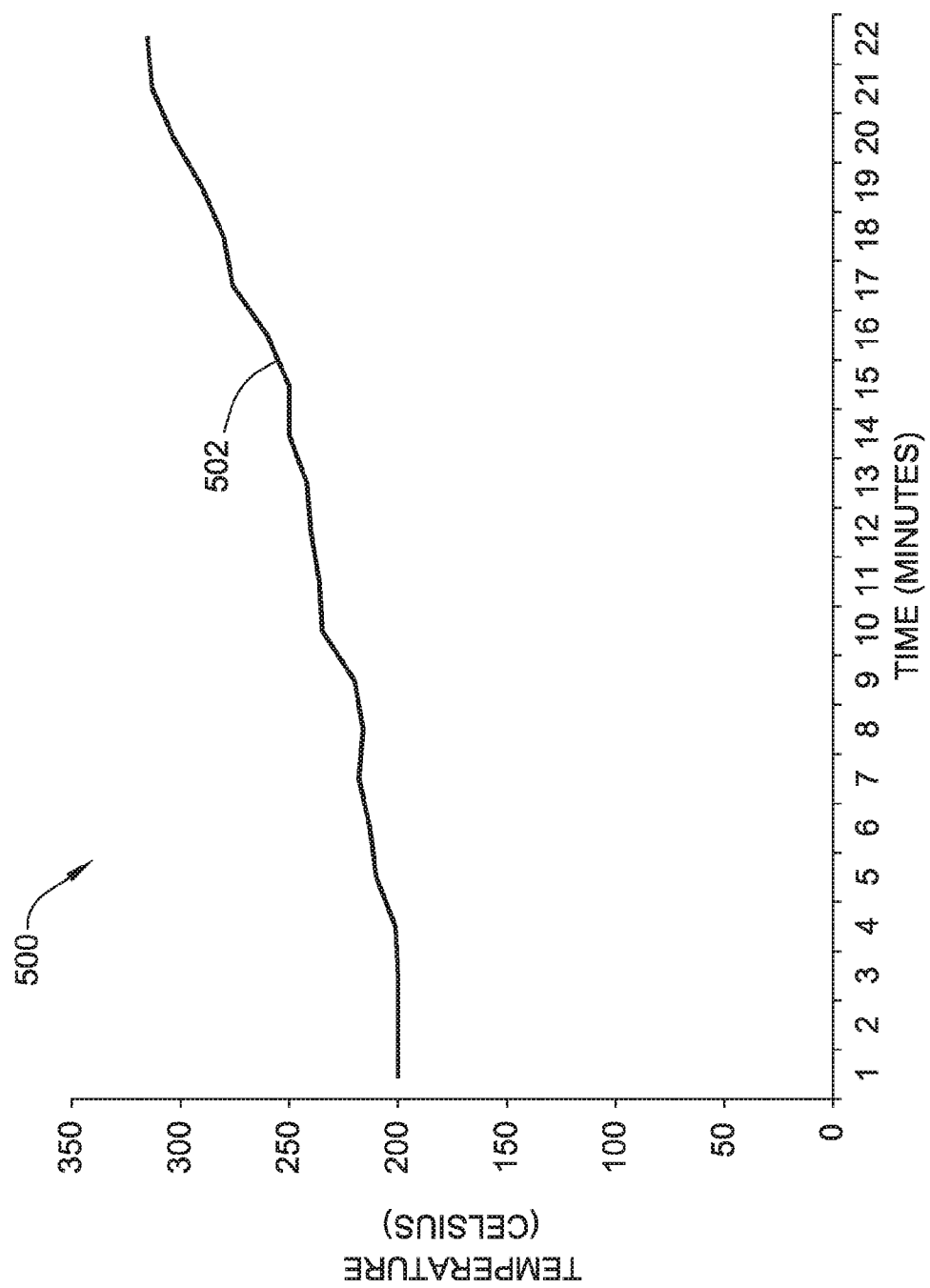
FIG. 5 is an exemplary plot that may be generated using the system shown in FIG. 2.

FIG. 5 is a plot 500 that may be generated using system 200 (FIG. 2) as a plot of a reference data set. Plot 500 may be displayed using a display device coupled to media output component 315 (FIG. 3) of computing device 302 (shown in FIG. 3). Plot 500 includes a trend 502 showing an increase in temperature over time. Plot 500 represents a malfunction in a component of a cooling system included in a machine that is of the same type as machine 102 (shown in FIG. 1). A user of computing device 302 (shown in FIG. 3), after seeing the similarity between trend 402 of plot 400 (shown in FIG. 4) and trend 502 of plot 500, may conclude that the corresponding component in the cooling system of machine 102 (shown in FIG. 1) must be malfunctioning. In an embodiment, a user would use input component 320 (shown in FIG. 3) of computing device 302 to select from a variety of reference data sets to view corresponding plots of malfunctions for machines identical or similar to machine 102. In other words, the computing device 302 provides the reference data sets stored in memory to enable a quick determination of whether the plot 400 corresponds to the plot 500. For example, the computing device 302 may provide the reference data sets sequentially displayed on top of a plot of the measurements of the system 200. As discussed below, each of the data sets may have a plot type associated with each data set that is suitable for displaying a characteristic of a particular malfunction associated with the reference data set. Based on the reference data set being evaluated versus the measurement data, the computing device 302 may display a plot of at least a portion of the measurement data to display the characteristic of the particular malfunction referenced by the reference data set.

In some embodiments, the computing device 302 may at least partially perform the analysis of the reference data sets to measurements of the system 200 to assist and/or train a user to interpret the plots 402 based on previous data. For example, the computing device 302 may compare the data set represented in plot 400 with the reference data sets, determine a degree of similarity between each reference data set and the data set associated with plot 400, and select and display a plot of the reference data set most similar to the data set of plot 400. When displaying a reference data plot 502 that corresponds to a vibrational indication of a characteristic associated with the reference data, the computing device 302 causes a vibrational indication of the measurement data as the measurement data plot 402 to be displayed similarly to the vibrational indication in a reference data plot 502. In other words, the reference data plot 402 may be used to establish how to display the measurement data plot 402. In some embodiments, a plot type of the measurement data plot 402 may be used to determine how to plot the reference data plots 502.

In some embodiments, the computing device 302 may provide guidance about whether a characteristic is similar between the measurement data plot 402 and the reference data plot 502. The vibrational indication may include a direct vibration amplitude measured at one or more of the sensors 114-136; 1× vibrational peak changes in frequency; specific vibration frequency peaks in a frequency domain analysis of vibrational data; filtered amplitude and phase for any harmonics of 1×; a position as measured by one or more sensors of the sensors 114-136; a shape or form of the plots 402 and 502 (e.g., vibrational orbit shape that is planar or circular); a precession direction of the measured machine 102, 104, 108, and/or 110; or any combination thereof. The plots 402 and 502 may have a similar shape or other analysis used to analyze the plots based on a curve fitting. For example, an algebraic equation may be determined for the plot 402 and for each of the reference data plots 502 using regression analysis, such as a sum of least squares. In some embodiments, the algebraic equations for the reference data plots 502 may be previously determined and stored before the measurements are captured for the measurement data plot 402. The computing device 302 may then determine which of the algebraic equations of curve fits for the reference plots is most similar to an algebraic equation of a curve fit for the measurements. In other words, the computing device may determine a degree of similarity between the measurement plot and multiple reference data plots.

In addition to or alternative to analysis of vibrational data, the computing system may analyze measurement data to determine a degree of similarity of the measurement data to reference data plots by examining temperature, pressures, and/or other operating conditions of the machines 102, 104, 108, and/or 110. For example, the computing device 302 may utilize a bearing temperature, a firing temperature, an exhaust temperature, or any other temperature inside or around the machines 102, 104, 108, and/or 110 that may be measured using the sensors 114-136. Additionally, or alternatively, the computing device 302 may analyze pressure and/or pressure differentials. For example, the computing device 302 may determine whether a plot 402 is similar to a reference plot 502 by examining an inlet pressure for the machines 102, 104, 108, and/or 110; an outlet pressure for the machines 102, 104, 108, and/or 110; and/or a difference in pressure from the inlet pressure to the outlet pressure.

In some embodiments, computing device 302 may also display an indication of the degree of similarity and/or display a description of the malfunction associated with the selected reference data set to help verify a condition (e.g., malfunction). This indication of the degree may include text or other visual representations. For example, a color around or of the overlaid plots or the reference plot 502 may be determined by the degree of similarity. The color may be static where one color (e.g., red) corresponds to a range of degree of similarity regardless of degrees of similarity to other reference plots while another color (e.g., green) corresponds to a higher range of values of the degree of similarity. In other words, the one color indicates that the plots are less similar than the other color. Alternatively, the colors for each plot may be established relative to other reference plots. For example, a reference plot that is the most similar to the measurement plot may be a first color (e.g., green) while the colors change for each plot that is less similar than the most similar reference plot. This color change may be a gradient such that small changes in the degree of similarity have less effect on the color displayed with the respective reference plots. In some embodiments, the reference plots may be presented in a static order. For example, the static order may correspond to most common malfunctions of the machines 102, 104, 108, and 110, and/or a rank of severity of the malfunctions. The computing device 302 may enable a user to sequentially step through these plots with assistance from the computing device 302 to determine how similar the occurrence is that is measured may be with a malfunction that is stored in the reference data. In some embodiments, computing device 302 may additionally display an explanation of why the plot looks the way it does. Additionally, in some embodiments, computing device 302 may additionally display a message that none of the reference data sets have enough correlation to the analysis data set to indicate the designated machine malfunction.

In addition, or alternative to assisting and/or identifying whether measurement data corresponds to particular reference plots, the computing device 302 may prioritize the various reference plots based on the similarity between each reference plot and the live measured data plot.

Figure 6:
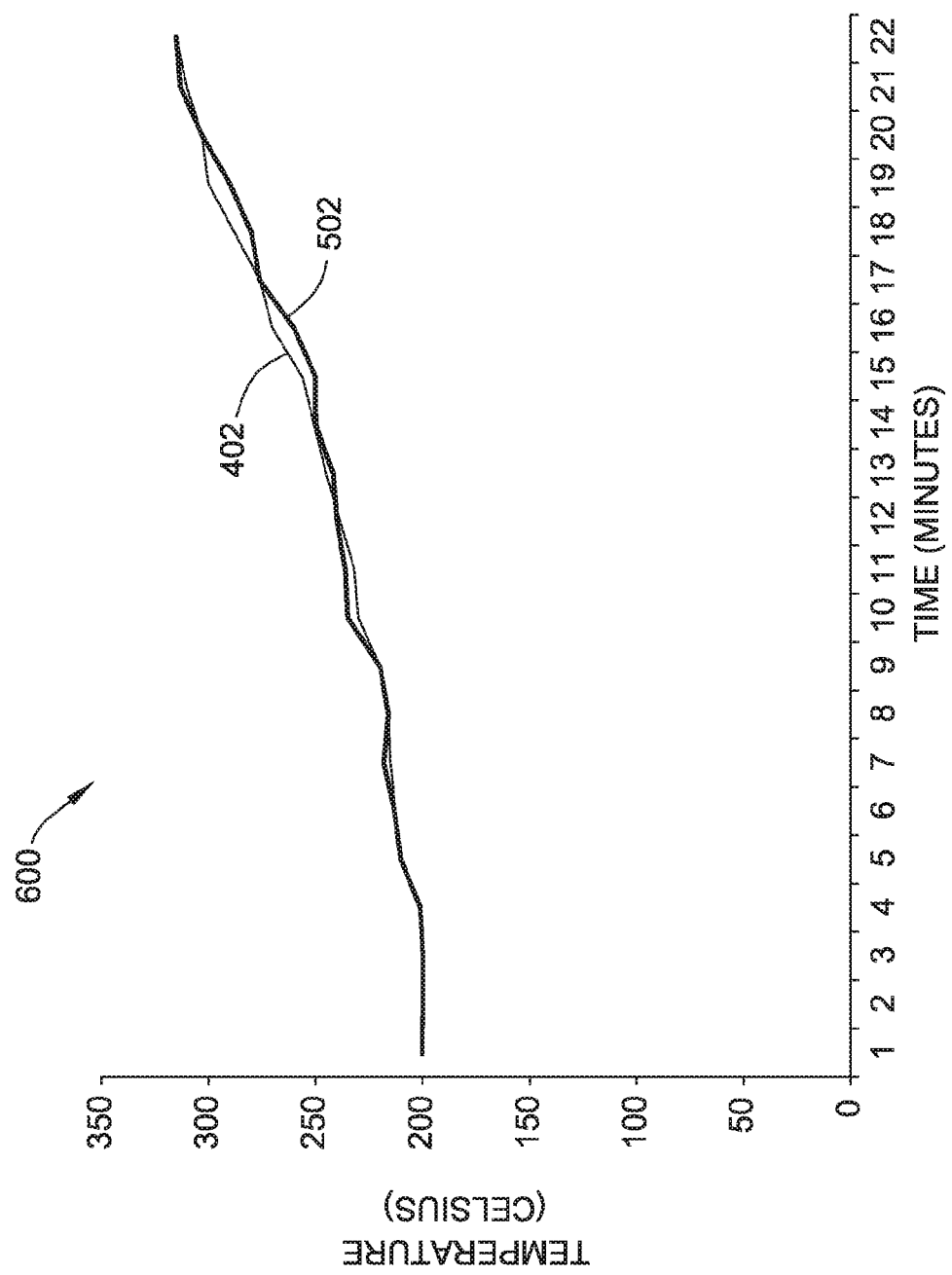
FIG. 6 is an exemplary plot that may be generated using the system shown in FIG. 2.

FIG. 6 is a plot 600 that may be generated using system 200. Plot 600 may be displayed using a display device coupled to media output component 315 (shown in FIG. 3) of a computing device. Plot 600 includes trend 402 of FIG. 4 and trend 502 of FIG. 5. That is, plots 400 and 500 are overlaid, forming plot 600. The similarity between trends 402 and 502 is apparent in plot 600. Overlaying plots 400 and 500 enables a user of computing device 302 (shown in FIG. 3) to visually judge the similarity between trends 402 and 502, and conclude that machine 102 is likely experiencing the malfunction associated with trend 502. That is, a user is able to determine from plot 600 that machine 102 (shown in FIG. 1) is experiencing a malfunction in a component of the cooling system of machine 102.

Figure 7:
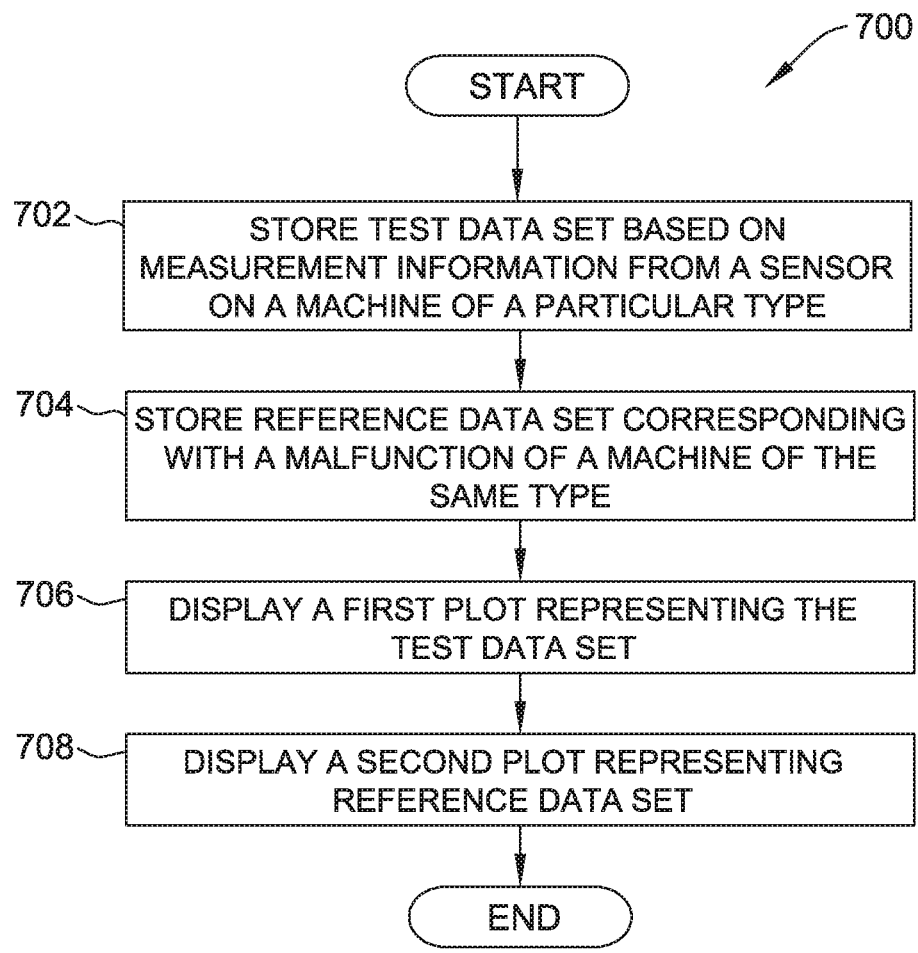
FIG. 7 indicates an order of storing test or analytic data prior to creating or storing reference data sets. The reference data sets would be collected and stored first. The reference data would be shipped with the product and compared to the test/analytic data set.

FIG. 7 is flowchart of a method 700 that may be implemented to correlate data collected from at least one sensor of a machine with a malfunction of the machine. The method 700 may be implemented by one or more computing devices 302 (shown in FIG. 3) of systems 100 (shown in FIG. 1) and system 200 (shown in FIG. 2). At step 702, at least one computing device 302 of system 200 stores, in memory area 310 (shown in FIG. 3), an analysis data set based on measurement information from at least one sensor on a machine of a particular type. For example, the analysis data set may be the temperature information from sensor 114 (shown in FIG. 1), discussed with reference to FIGS. 4 and 6. Again, sensor 114 is associated with machine 102 (shown in FIG. 1). At step 704, at least one computing device 302 stores in memory area 310 at least one reference data set. Each reference data set corresponds to a malfunction of a machine of the same type as machine 102. Steps 702 and 704 may be carried out in the opposite order. At step 706, at least one computing device 302 displays a first plot representing the analysis data set, for example plot 400 of FIG. 4. At step 708, at least one computing device 302 displays a second plot representing a reference data set stored in step 704. For example, the second plot may be plot 500 (shown in FIG. 5) or plot 600 (shown in FIG. 6), which is a combination of plots 400 (shown in FIG. 4) and 500 (shown in FIG. 5).

Figure 8:
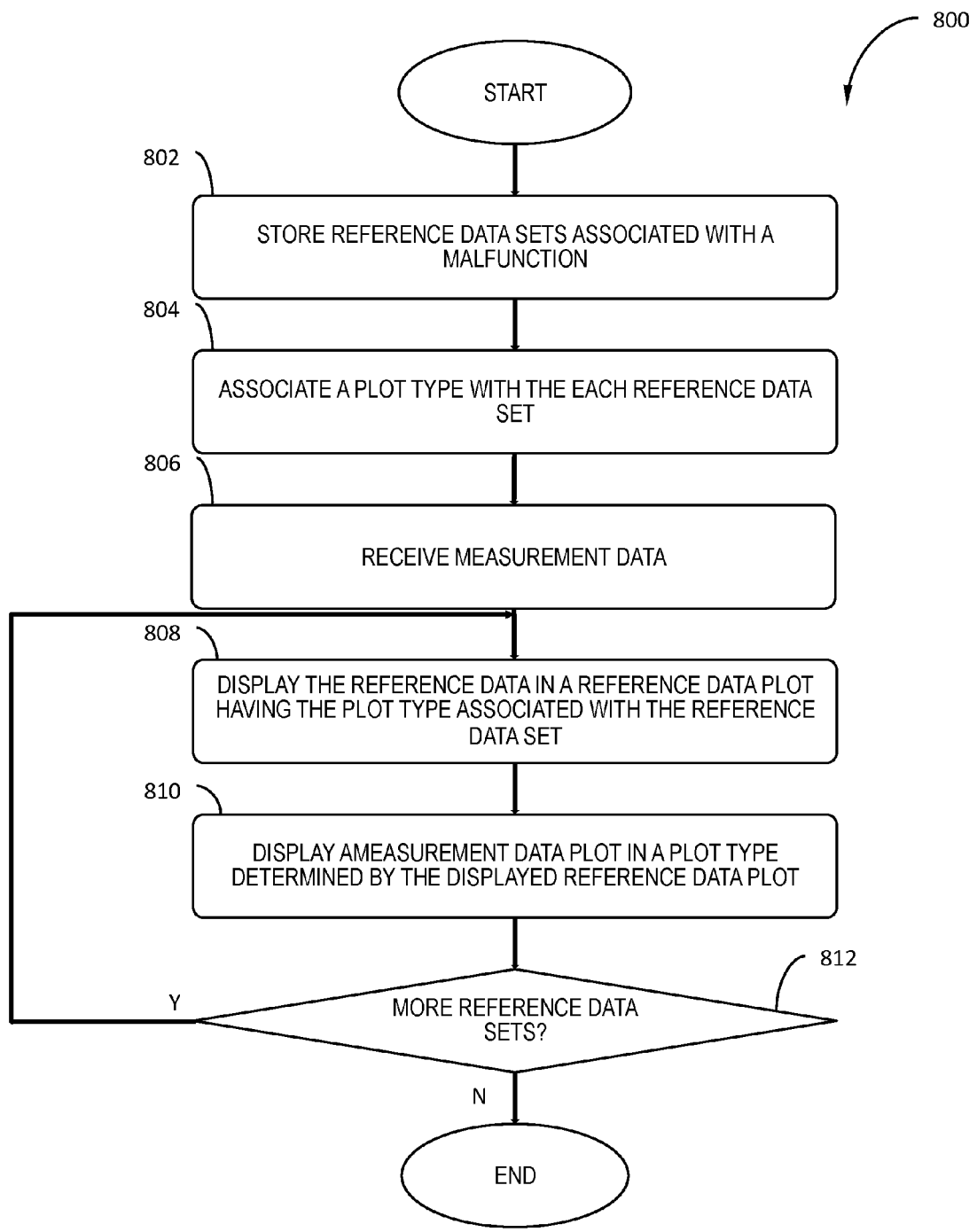
FIG. 8 is a flowchart of a process for classifying operation or malfunction of one or more machines.

FIG. 8 is a flowchart of a method 800 that may be implemented to correlate data collected from at least one sensor of one or more machines with a malfunction of the one or more machines. The computing device 302 stores reference data sets associated with a malfunction (block 802). For example, previous data measurements that have been identified to the malfunction may each be stored with metadata indicating the malfunction type. For example, a technician may enter this malfunction label to label the reference data set to which is associated. Additionally, or alternatively, a condition of the machine may be associated with the reference data set. For example, the condition may indicate cold conditions, hot conditions, and/or other ambient conditions around the one or more machines.

The computing device 320 also associates a plot type with each reference data set (block 804). This association may be made by a technician and identifies a plot type that is suitable for detecting the malfunction from the reference data set. By associating the plot type with a particular reference data set and its associated malfunction, the computing device 320 displays reference data and measurement data in a plot type that is useful for determining similarity between the measurement data and reference data for classifying conditions or malfunctions of the one or more machines from the reference data.

At a point in time (e.g., after associating a plot type with each stored reference data sets), the computing device 302 receives measurement data from sensors (block 806). This measurement data may be indicative of various conditions of the one or more machines and may include any suitable operating conditions, such as temperature, vibration, or other operating conditions.

The computing device 302 causes display of a plot of reference data in a reference data plot with its associated plot type (block 806). The computing device 302 may display multiple reference data plots sequentially or simultaneously. The computing device 302 may establish a sequence for sequential display based on how common each of the associated conditions or malfunctions are to occur for the one or more machines. Additionally, or alternatively, the sequence may be established by how similar each reference data set is to the measurement data (at least in their respective plots).

Based on the plot type associated with the reference data to be display, the computing device 302 displays the measurement data in the plot type (block 810). The computing device 302 may also display an indication of a level of similarity between the measurement data plot and the reference data plot that are displayed. For example, the computing device 302 may display a color around or on the measurement data plot and/or the reference data plot that corresponds to a gradient of level of similarity. Additionally, or alternatively, the computing device 302 may display textual or numerical values indicating the degree of similarity.

Since the reference data sets may include one or more reference data sets, the computing device 302 determines whether additional reference data sets are to be displayed after the current reference data plot is displayed (block 812). This determination may be made whether additional reference data plots exist in memory. Additionally, or alternatively, the determination may be made by determining whether a command (e.g., key press or mouse scroll) has been received to advance between plots. If more plots are to be displayed, the computing device 302 displays the next reference data with its associated plot type. This display of the next reference data plot may include changing from a first plot type to a second plot type and displaying the next reference data plot and the measurement data in the second plot type. In some embodiments, the computing device 302 and/or an operator confirms correlation of the measurement data and a reference data set most similar to the measurement data. In some embodiments, the computing device 302 controls the one or more machines based on the operating condition or malfunction to which the measurement data is correlated. For example, the one or more machines may be slowed or shut down based on the correlation.

Although the foregoing discusses plot type based on a current reference data plot, in some embodiments, the plot type may be determined from a current view of the measurement data. Additionally or alternatively, the plot type may be received explicitly from an operator or other control device. The current reference data and the measurement data may be displayed according to the indicated plot type.

In some embodiments, the steps of methods 700 and 800 are carried out exclusively by central server system 150 (shown in FIGS. 1 and 2) and the plot is displayed on a visual display local to central server system 150. In some embodiments, a computing device communicatively coupled to central server system 150, such as workstation 254 (shown in FIG. 2), requests and receives the data sets, stores the data sets in memory 310 (shown in FIG. 3), and displays the plots as discussed above. In some embodiments, a portion of the steps of method 700 are carried out by central server system 150 and a second portion of the steps are carried out by a computing device communicatively coupled to central server system 150. In some embodiments, methods 700 and 800 are carried out by a single computing device 302 (shown in FIG. 3), coupled to one or more sensors.

A technical effect of systems and methods described herein includes at least one of: (a) storing, in a memory of a computing device, an analysis data set based on measurement information from the at least one sensor; (b) storing, in the memory, at least one reference data set corresponding with a malfunction of a second machine, the second machine being of the first type; (c) displaying, with a display device of a computing device, a first plot representing the analysis data set; and (d) displaying, with the display device, a second plot representing one reference data set of the at least one reference data set.

As compared to known methods and systems for plotting data collected from a sensor of a machine, the methods and systems described herein generate plots that more easily allow a user to perceive that a specific malfunction has occurred in the machine. Exemplary embodiments of methods and systems for plotting such data are described above in detail. The methods and systems described herein are not limited to the specific embodiments described herein, but rather, components of the systems and/or steps of the methods may be utilized independently and separately from other components and/or steps described herein This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computing device-implemented method for correlating data collected from at least one sensor of machinery with a malfunction of the machinery, the method comprising:
    storing, in a memory, one or more reference data sets, wherein each reference data set is associated with a malfunction of the machinery;
    receiving measurement data based on measurement information from the at least one sensor;
    displaying, with a display device, a first plot representing a reference data set of the one or more reference data sets, wherein the first plot has a plot type associated with the reference data set;
    displaying, with the display device, a second plot representing the measurement data, wherein the second plot is plotted using the first plot based at least in part with the association of the plot type with the reference data set;
    displaying, with the display device, an explanation of an appearance of the second plot; and
    displaying, with the display device, a description of the malfunction associated with the measurement data represented by the second plot, wherein the description comprises an indication of a level of similarity between the first plot and the second plot, wherein the indication comprises at least one of a color on or around the first plot or the second plot and a textual indication of the level of similarity.

2. The method of claim 1, wherein displaying the second plot comprises overlaying the second plot over the first plot.

3. The method of claim 1 comprising curve fitting the first and second plots to determine the level of similarity.

4. The method of claim 3, wherein curve fitting comprises determining a sum of least squares and examining residuals.

5. The method of claim 1, wherein each reference data set of the one or more reference data sets corresponds to a different malfunction of the machinery.

6. The method of claim 1 comprising arranging the one or more reference data sets in a sequence.

7. The method of claim 6, wherein arranging the one or more reference data sets in the sequence comprises sorting the one or more reference data sets in a decreasing likelihood of occurrence for the machinery.

8. The method of claim 6, wherein arranging the one or more reference data sets in the sequence comprises sorting the one or more reference data sets in a decreasing order based on a level of similarity between respective plots corresponding the one or more reference data sets and the measurement data.

9. A computing device for correlating data collected from at least one sensor of a machinery with a condition of the machinery, the computing device comprising:
    a processor;
    a display device coupled to the processor; and
    a memory coupled to the processor, wherein the memory contains processor-executable instructions configured to cause the processor to:
    store, in the memory, one or more reference data sets, wherein each reference data set is associated with a condition of the machinery;
    receive measurement data based on measurement information from the at least one sensor;
    display, with a display device, a reference plot representing a reference data set of the one or more reference data sets, wherein the first plot has a plot type associated with the reference data set;
    display, with the display device, a measurement plot representing the measurement data based at least in part with the association of the plot type with the reference data set;
    determine a level of similarity between the first plot and the second plot using curve fitting; and
    displaying, with the display device, a description of a malfunction associated with the measurement data represented by the second plot, wherein the description comprises an indication of the level of similarity.

10. The computing device of claim 9, wherein each of the one or more reference data sets corresponds to a different condition of the machinery.

11. The computing device of claim 9, comprising an input device coupled to the processor, and the memory contains processor-executable instructions configured to cause the processor to:
    receive an input with the input device; and
    select the reference data set of the one or more reference data sets based on the input.

12. The computing device of claim 9, wherein the curve fitting comprises determining a sum of least squares and examining residuals.

13. A method comprising:
    storing, in a memory, two or more reference data sets, wherein each reference data set is associated with a condition of the machinery;
    receiving measurement data based on measurement information from at least one sensor of the machinery;
    displaying, with a display device, a first plot representing a first reference data set of the two or more reference data sets, wherein the first plot has a first plot type associated with a first condition of the machinery;

displaying, with the display device, a second plot representing the measurement data, wherein the second plot is plotted using the first plot type;

displaying, with the display device, a third plot representing a second reference data set of the two or more reference data sets, wherein the third plot has a second plot type associated with a second condition of the machinery; and changing the display of the measurement data from the first plot type to the second plot type based at least in part on the display of the third plot.

14. The system of claim 13, wherein the first condition of the machinery comprises a first malfunction of the machinery and the second condition of the machinery comprises a second malfunction of the machinery.

15. The method of claim 13 comprising:

determining a degree of similarity between the first plot and the second plot; and displaying an indication of the degree of similarity.

* * * * *